(12) United States Patent
Wang

(10) Patent No.: US 12,506,424 B2
(45) Date of Patent: Dec. 23, 2025

(54) BRUSHLESS DC MOTOR BRAKING SYSTEM AND METHOD

(71) Applicant: JIANGSU DONGCHENG TOOLS TECHNOLOGY CO., LTD., Nantong (CN)

(72) Inventor: Haodong Wang, Nantong (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 198 days.

(21) Appl. No.: 18/461,481

(22) Filed: Sep. 5, 2023

(65) Prior Publication Data

US 2024/0030841 A1    Jan. 25, 2024

Related U.S. Application Data

(63) Continuation of application No. PCT/CN2022/133040, filed on Nov. 19, 2022.

(30) Foreign Application Priority Data

Jul. 20, 2022  (CN) .......................... 202210850753.6

(51) Int. Cl.
*H02P 3/20*        (2006.01)
(52) U.S. Cl.
CPC ..................................... *H02P 3/20* (2013.01)
(58) Field of Classification Search
CPC .... H02P 3/22; H02P 27/00; H02P 5/00; H02P 6/00; H02P 7/00; H02P 8/00
See application file for complete search history.

(56) References Cited

U.S. PATENT DOCUMENTS

2017/0234484 A1*  8/2017 Vanko ................... B24B 23/028
                                                                    173/176

FOREIGN PATENT DOCUMENTS

| CN | 102811021 A | 12/2012 |
| CN | 104660121 A | 5/2015 |
| CN | 104753402 A | 7/2015 |
| CN | 205509478 U | 8/2016 |

(Continued)

OTHER PUBLICATIONS

Chinese First Office Action, Chinese Application No. 202210850753. 6, mailed Sep. 8, 2022 (10 pages).

(Continued)

*Primary Examiner* — Said Bouziane

(57) ABSTRACT

The present disclosure discloses a brushless DC motor braking system and method. during the braking process of the brushless DC motor, the busbar voltage value is controlled to always be between the high threshold of the busbar voltage and low threshold of the busbar voltage through the brake control module; and different PWM modulation signals are used to control the brushless DC motor 4 to perform slow braking until stopping based on different busbar voltage states. Thus, in the present disclosure, the method not only ensures that the busbar voltage value continues to be maintained between the high threshold of the busbar voltage and low threshold of the busbar voltage, thereby protecting electronic components and circuits and extending their service life; but also avoids the hard braking method of direct conduction of the three lower transistors of the three-phase inverter in related arts.

19 Claims, 9 Drawing Sheets

(56) References Cited

FOREIGN PATENT DOCUMENTS

| | | | |
|---|---|---|---|
| CN | 107484488 | A | 12/2017 |
| CN | 107819394 | A | 3/2018 |
| CN | 108631662 | A | 10/2018 |
| CN | 112448620 | A | 3/2021 |
| CN | 213342062 | U | 6/2021 |
| CN | 114157188 | A | 3/2022 |
| CN | 115001323 | A | 9/2022 |
| JP | 2015177603 | A | 10/2015 |
| JP | 2021065074 | A | 4/2021 |

OTHER PUBLICATIONS

International search report, International Application No. PCT/CN2022/133040, mailed Mar. 16, 2023 (15 pages).

\* cited by examiner

BRUSHLESS DC MOTOR BRAKING SYSTEM AND METHOD

CROSS-REFERENCE TO RELATED APPLICATIONS

The present disclosure is a continuation-application of International (PCT) Patent Application No. PCT/CN2022/133040 filed Nov. 19, 2022, which claims priority of Chinese Patent Application No. 202210850753.6, titled "BRUSHLESS DC MOTOR BRAKING SYSTEM AND METHOD", filed on Jul. 20, 2022, the contents of which are hereby incorporated by reference.

TECHNICAL FIELD

The present disclosure relates to the field of brushless motor control, and in particular, to a brushless DC motor braking system and method.

BACKGROUND

Some electric tools have safety regulations or user feel requirements, requiring a motor to brake after a user releases a switch to achieve rapid machine shutdown.

In related arts, there are some shortcomings and drawbacks in some motor braking technologies: (1) for a motor braking scheme based on three-phase lower transistor conduction as shown in FIG. 1 of the description, the motor braking is achieved by directly controlling three upper transistors of a three-phase inverter to close and three lower transistors to conduct, and the disadvantage of the method is that during braking, the phase short circuit current is large, which can easily cause damage to circuit components, the braking mode transition is not smooth, and the user's touch is poor; (2) for a motor braking scheme based on Pulse Width Modulator (PWM) modulation of the three-phase lower transistor as shown in FIG. 2 of the description, the motor braking is achieved through three-phase lower transistor PWM modulation, and the disadvantage of this method is that during braking, when the PWM changes from an on state to an off state a phase current in a negative direction will flow into a power module through a MOS diode, however, in backpack electric tools, a busbar and a battery pack are generally not directly connected, there is a forward diode connected between the battery pack and the busbar, resulting in preventing the energy of the busbar circuit from being fed back to the battery pack, thereby continuously increasing the busbar voltage, and as shown in FIG. 3 of the description, when the busbar voltage exceeds a withstand voltage value, electronic components and circuits are prone to damage.

Therefore, it is necessary to design a brushless DC motor braking system and method to solve the above problems.

SUMMARY

The purpose of the present disclosure is to provide a brushless DC motor braking system and method to solve the issue of continuous increase in busbar voltage during braking, resulting in damage to electronic components and circuits, while avoiding problems of the high phase current during braking, unstable tool transition, and poor user feel.

To achieve the above objectives, the present disclosure adopts the following technical solution:

A brushless DC motor braking system, includes a DC power supply, a three-phase inverter, and a controller. The DC power supply is electrically connected to the three-phase inverter through a busbar circuit, and the three-phase inverter is electrically connected to a brushless DC motor; the controller is electrically connected to the three-phase inverter to control and drive an operation of the brushless DC motor; a voltage sampling module is electrically connected between positive and negative poles of the DC power supply for collecting a busbar voltage value of the busbar circuit when the brushless DC motor brakes.

The controller includes a brake control module electrically connected to the voltage sampling module and internally preset with a high threshold of the busbar voltage and a low threshold of the busbar voltage.

The brake control module controls the busbar voltage value to be between the high threshold of the busbar voltage and the low threshold of the busbar voltage, for controlling the brushless DC motor to perform slow braking until stopping.

The present disclosure provides a brushless DC motor braking method performed by a brushless DC motor braking system, including:

a brushless DC motor braking with duty cycle of PWM modulation signals of three upper transistors of a three-phase inverter as zero and duty cycle of PWM modulation signals of three lower transistors of the three-phase inverter as an initial duty cycle of the PWM modulation signals;

converting an analog voltage signal sampled by a voltage sampling module into a digital voltage signal through an ADC module during a braking process, wherein the digital voltage signal is a busbar voltage value; determining whether the busbar voltage value is between a high threshold of the busbar voltage and a low threshold of the busbar voltage in real time through a computing module;

in response to the busbar voltage value triggering the high threshold of the busbar voltage, a PWM modulation module outputting PWM modulation signals with duty cycle of all six switch transistors of the three-phase inverter being zero;

in response to the busbar voltage value triggering the low threshold of the busbar voltage, the PWM modulation module outputting PWM modulation signals with duty cycle of the PWM modulation signals of the three upper transistors of the three-phase inverter being zero and duty cycle of the PWM modulation signals of the three lower transistors of the three-phase inverter being the initial duty cycle of the PWM modulation signals;

during a slow braking process of the brushless DC motor, in response to the busbar voltage value triggering the high threshold of the busbar voltage N0 times within duration time T0, the PWM modulation module outputting PWM modulation signals with decreasing duty cycle to the three lower transistors of the three-phase inverter;

in response to the busbar voltage value triggering the low threshold of the busbar voltage N0 times within duration time T0, the PWM modulation module outputting PWM modulation signals with increasing duty cycle to the three lower transistors of the three-phase inverter; and controlling the busbar voltage value to be between the high threshold of the busbar voltage and low threshold of the busbar voltage through a brake control module, for controlling the brushless DC motor to perform slow braking until stopping.

Alternatively, the brushless DC motor braking method includes:
a brushless DC motor braking with duty cycle of the PWM modulation signals of three upper transistors of a three-phase inverter as zero and duty cycle of the PWM modulation signals of three lower transistors of the three-phase inverter as an initial duty cycle of the PWM modulation signals;
converting an analog voltage signal sampled by a voltage sampling module into a digital voltage signal through an ADC module during a braking process, wherein the digital voltage signal is a busbar voltage value;
determining whether the busbar voltage value is between a high threshold of the busbar voltage and a low threshold of the busbar voltage in real time through a computing module;
in response to the busbar voltage value triggering the high threshold of the busbar voltage, a PWM modulation module outputting PWM modulation signals with duty cycle of all six switch transistors of the three-phase inverter being zero;
in response to the busbar voltage value triggering the low threshold of the busbar voltage, the PWM modulation module outputting PWM modulation signals with duty cycle of the three upper transistors of the three-phase inverter being zero and duty cycle of the three lower transistors of the three-phase inverter being the initial duty cycle of the PWM modulation signals;
in response to the number of times the busbar voltage value triggering the high threshold of the busbar voltage within duration time T1 being greater than a high threshold N2 of the number of times, the PWM modulation module outputting PWM modulation signals with the gradual decreasing duty cycle to three lower transistors of the three-phase inverter, until the number of times the busbar voltage value triggering the high threshold of the busbar voltage within duration time T1 is between the low threshold N1 of the number of times and the high threshold N2 of the number of times;
in response to the number of times the busbar voltage value triggering the high threshold of the busbar voltage within duration time T1 being less than a low threshold N1 of the number of times, the PWM modulation module outputting PWM modulation signals with the gradual increasing duty cycle to three lower transistors of the three-phase inverter, until the number of times the busbar voltage value triggering the high threshold of the busbar voltage within duration time T1 is between the low threshold N1 of the number of times and the high threshold N2 of the number of times; and
controlling the busbar voltage value to be between the high threshold of the busbar voltage and low threshold of the busbar voltage through a brake control module, for controlling the brushless DC motor to perform slow braking until stopping.

The present disclosure provides a brushless DC motor braking system. The brushless DC motor braking system includes a brushless DC motor, a processor and a memory storing executable instructions of the processor. When the instructions are executed by the processor, the processor is configured to perform:
braking with duty cycle of PWM modulation signals of three upper transistors of a three-phase inverter as zero and duty cycle of PWM modulation signals of three lower transistors of the three-phase inverter as an initial duty cycle of the PWM modulation signals;
converting an analog voltage signal into a digital voltage signal through an ADC module during a braking process, wherein the digital voltage signal is a busbar voltage value;
determining whether the busbar voltage value is between a high threshold of the busbar voltage and a low threshold of the busbar voltage in real time;
in response to the busbar voltage value triggering the high threshold of the busbar voltage, outputting PWM modulation signals with duty cycle of all six switch transistors of the three-phase inverter being zero;
in response to the busbar voltage value triggering the low threshold of the busbar voltage, outputting PWM modulation signals with duty cycle of the PWM modulation signals of the three upper transistors of the three-phase inverter being zero and duty cycle of the PWM modulation signals of the three lower transistors of the three-phase inverter being the initial duty cycle of the PWM modulation signals;
during a slow braking process of the brushless DC motor, in response to the busbar voltage value triggering the high threshold of the busbar voltage N0 times within duration time T0, outputting PWM modulation signals with decreasing duty cycle to the three lower transistors of the three-phase inverter;
in response to the busbar voltage value triggering the low threshold of the busbar voltage N0 times within duration time T0, outputting PWM modulation signals with increasing duty cycle to the three lower transistors of the three-phase inverter; and
controlling the busbar voltage value to be between the high threshold of the busbar voltage and low threshold of the busbar voltage, for controlling the brushless DC motor to perform slow braking until stopping.

Alternatively, the processor is configured to perform:
braking with duty cycle of the PWM modulation signals of three upper transistors of a three-phase inverter as zero and duty cycle of the PWM modulation signals of three lower transistors of the three-phase inverter as an initial duty cycle of the PWM modulation signals;
converting an analog voltage signal into a digital voltage signal through an ADC module during a braking process, wherein the digital voltage signal is a busbar voltage value;
determining whether the busbar voltage value is between a high threshold of the busbar voltage and a low threshold of the busbar voltage in real time;
in response to the busbar voltage value triggering the high threshold of the busbar voltage, a PWM modulation module outputting PWM modulation signals with duty cycle of all six switch transistors of the three-phase inverter being zero;
in response to the busbar voltage value triggering the low threshold of the busbar voltage, outputting PWM modulation signals with duty cycle of the three upper transistors of the three-phase inverter being zero and duty cycle of the three lower transistors of the three-phase inverter being the initial duty cycle of the PWM modulation signals;
in response to the number of times the busbar voltage value triggering the high threshold of the busbar voltage within duration time T1 being greater than a high threshold N2 of the number of times, outputting PWM modulation signals with the gradual decreasing duty cycle to three lower transistors of the three-phase inverter, until the number of times the busbar voltage value triggering the high threshold of the busbar voltage within duration time T1 is between the low threshold N1 of the number of times and the high threshold N2 of the number of times;

in response to the number of times the busbar voltage value triggering the high threshold of the busbar voltage within duration time T1 being less than a low threshold N1 of the number of times, outputting PWM modulation signals with the gradual increasing duty cycle to three lower transistors of the three-phase inverter, until the number of times the busbar voltage value triggering the high threshold of the busbar voltage within duration time T1 is between the low threshold N1 of the number of times and the high threshold N2 of the number of times; and controlling the busbar voltage value to be between the high threshold of the busbar voltage and low threshold of the busbar voltage, for controlling the brushless DC motor to perform slow braking until stopping.

BRIEF DESCRIPTION OF THE DRAWINGS

The present disclosure will be described more fully below with reference to the relevant drawings and embodiments.

FIG. 7 is a waveform diagram of PWM modulation signals output by a PWM modulation module of the present disclosure, with three lower transistors of a three-phase inverter turning on.

Figure 1:
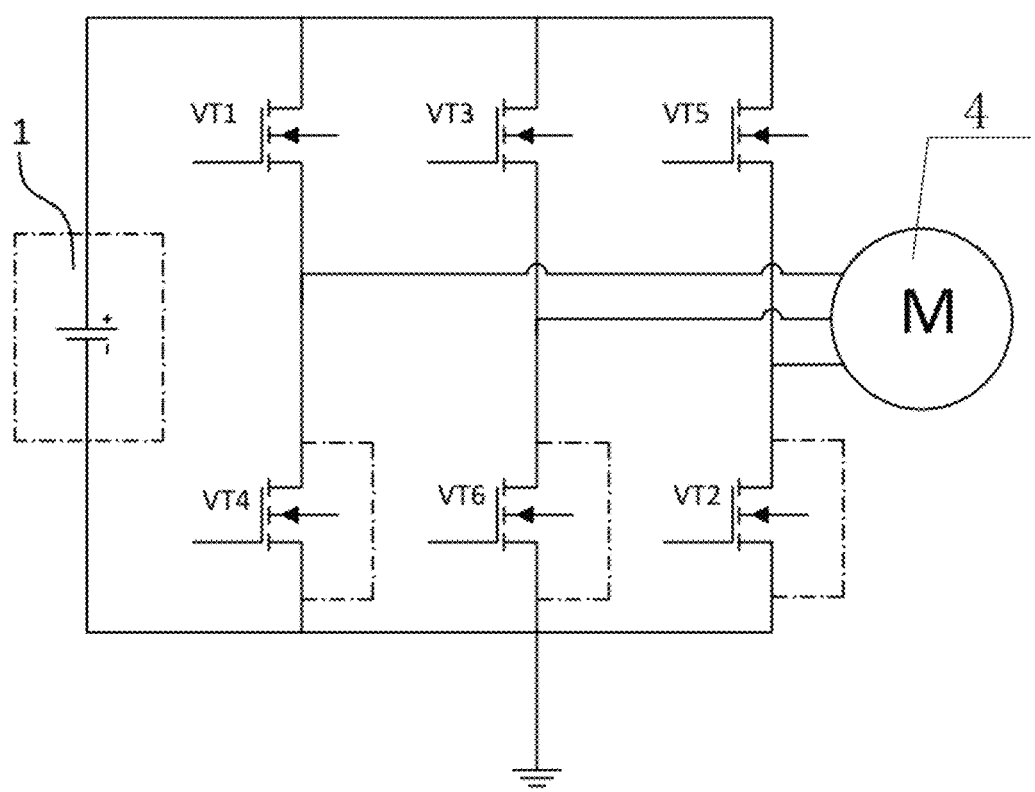
FIG. 1 is a structural diagram of a motor brake based on three transistor conduction under a three-phase inverter in related arts.
Figure 2:
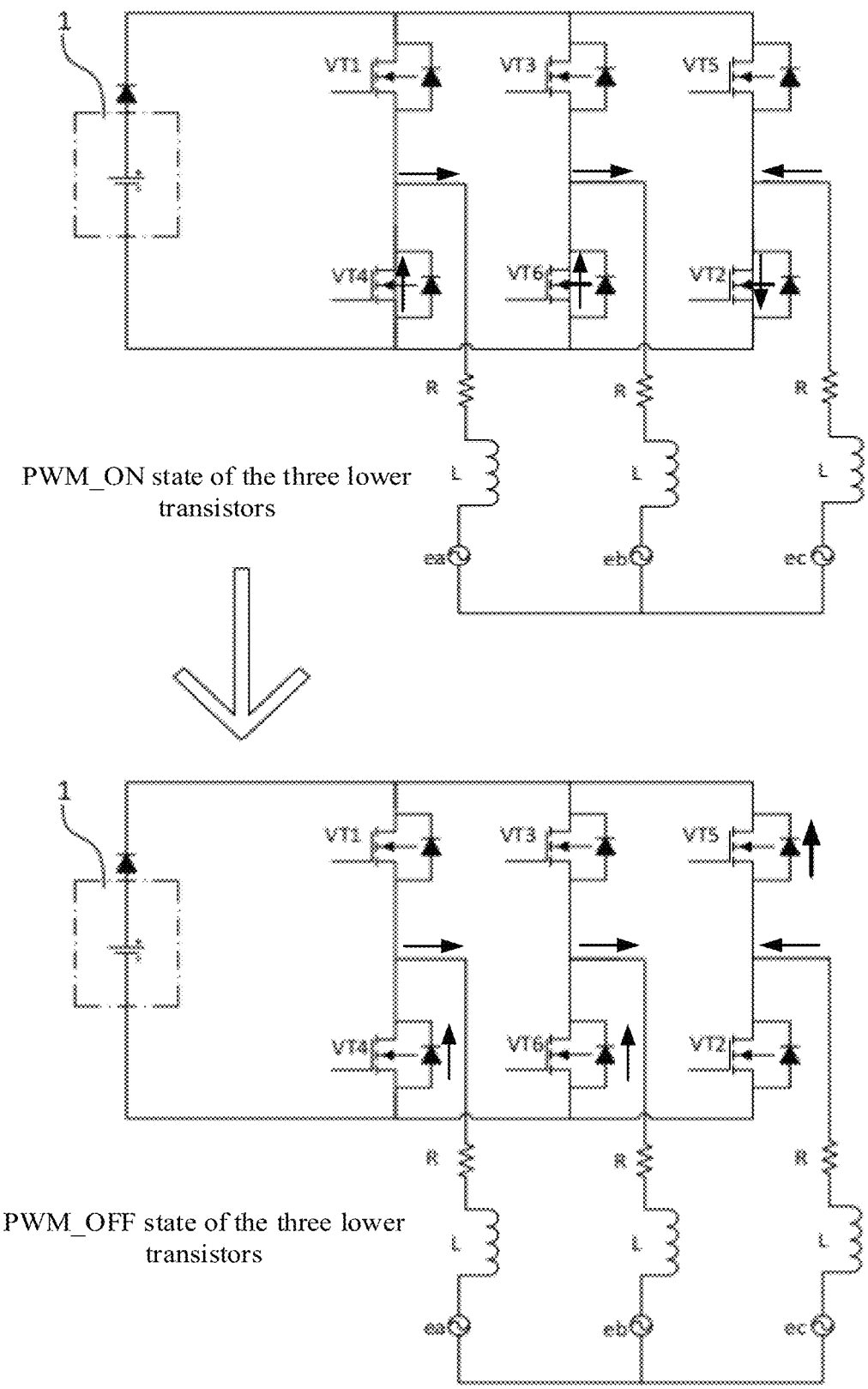
FIG. 2 is a structural diagram of a motor brake based on three transistor PWM modulation under a three-phase inverter in related arts, with directional arrows with a direction of current flow.
Figure 3:
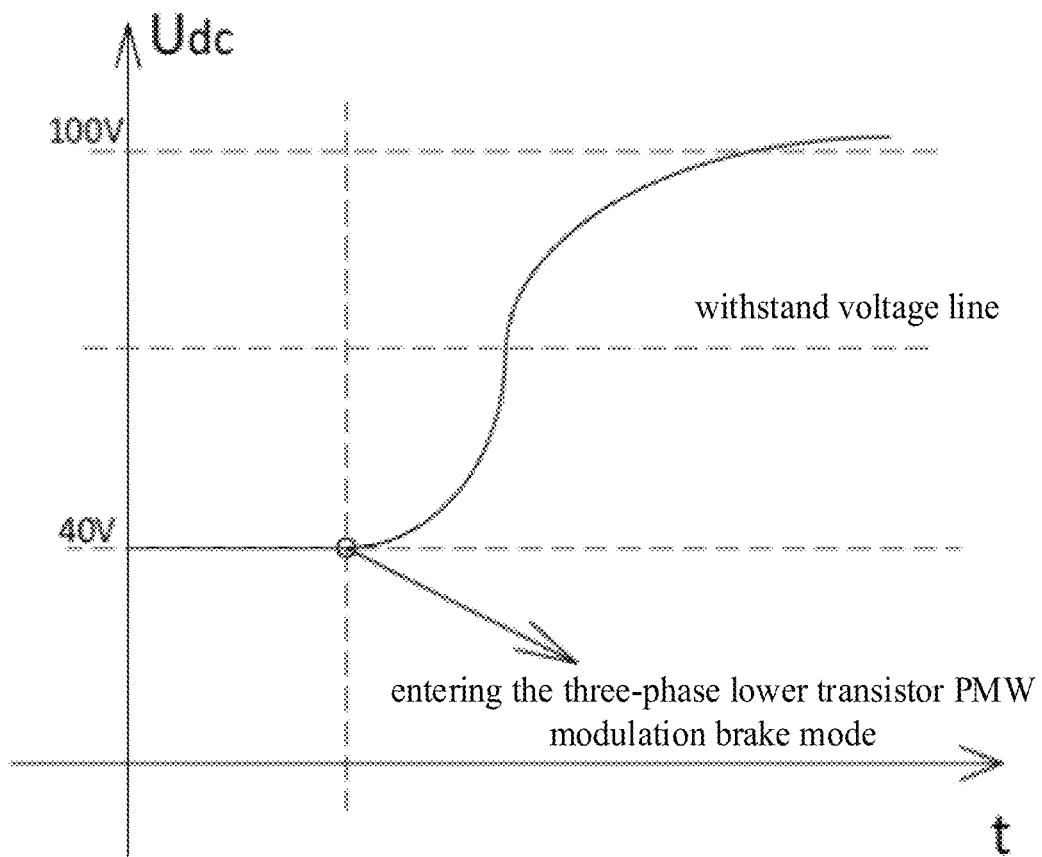
FIG. 3 is a schematic diagram of a motor brake busbar voltage based on three-phase inverter with three transistor PWM modulation in related arts.

The meaning of the labels in the drawings is described as follows:

1, DC power supply; 2, three-phase inverter; 3, controller; 4, brushless DC motor; 5, busbar circuit; 6, voltage sampling module; 7, brake control module; 8, computing module; 9, storage unit; 10, timing unit; 11, PWM modulation module; 12, ADC module; 212, processor; 213, memory.

DETAILED DESCRIPTION OF THE PREFERRED EMBODIMENTS

The present disclosure will be described more fully below with reference to the relevant drawings and embodiments.

In some embodiments, a brushless DC motor braking system is provided by the present disclosure. 1. The brushless DC motor braking system includes a DC power supply, a three-phase inverter, and a controller. The DC power supply is electrically connected to the three-phase inverter through a busbar circuit, and the three-phase inverter is electrically connected to a brushless DC motor; the controller is electrically connected to the three-phase inverter to control and drive an operation of the brushless DC motor; a voltage sampling module is electrically connected between positive and negative poles of the DC power supply for collecting a busbar voltage value of the busbar circuit when the brushless DC motor brakes; the controller comprises a brake control module electrically connected to the voltage sampling module and internally preset with a high threshold of the busbar voltage and a low threshold of the busbar voltage; the brake control module controls the busbar voltage value to be between the high threshold of the busbar voltage and the low threshold of the busbar voltage, for controlling the brushless DC motor to perform slow braking until stopping.

In an embodiment, in response to the busbar voltage value triggering the high threshold of the busbar voltage, the brake control module controls six switch transistors of the three-phase inverter to turn off; in response to the busbar voltage value triggering the low threshold of the busbar voltage, the brake control module controls three upper transistors of the three-phase inverter to turn off and three lower transistors to turn on.

In an embodiment, the brake control module comprises a computing module, a storage unit, a timing unit, and a PWM modulation module; the computing module is electrically connected to the voltage sampling module through an ADC module, and both the storage unit and the timing unit are electrically connected to the computing module; the computing module is further electrically connected to the three-phase inverter through the PWM modulation module, and the storage unit is preset with the high threshold of the busbar voltage and the low threshold of the busbar voltage.

In an embodiment, the ADC module is configured to convert an analog voltage signal sampled by the voltage sampling module into a digital voltage signal, and the digital voltage signal is the busbar voltage value; the computing module is configured to determine whether the busbar voltage value triggers the high threshold of the busbar voltage or low threshold of the busbar voltage, and to count the number of times the busbar voltage value triggers the high threshold of the busbar voltage or low threshold of the busbar voltage; the timing unit is configured to control the computing module to detect a duration time of the busbar voltage value triggering the high threshold or the low threshold of the busbar voltage; the PWM modulation module generates corresponding PWM modulation signals based on different states of the busbar voltage value detected by the computing module, and the PWM modulation signals are configured to control the six switch transistors of the three-phase inverter to turn off or turn on, and control the brushless DC motor to perform slow braking process.

In an embodiment, during the slow braking process of the brushless DC motor, in response to the busbar voltage value triggering the high threshold of the busbar voltage N0 times within a duration time T0, the brake control module controls duty cycle of the PWM modulation signals of the three lower transistors of the three-phase inverter to be decreased; in response to the busbar voltage value triggering the low threshold of the busbar voltage N0 times within the duration time T0, the brake control module controls the duty cycle of the PWM modulation signals of the three lower transistors of the three-phase inverter to be increased.

In an embodiment, a range of the duration time T0 is 10 ms to 100 ms, and a range of N0 is 5 to 20 times.

In an embodiment, the storage unit is preset with an initial duty cycle of the PWM modulation signals of the three lower transistors of the three-phase inverter when the brushless DC motor brakes, and the duty cycle of the PWM modulation signals of the three upper transistors of the three-phase inverter is always zero.

In an embodiment, the storage unit is preset with a low threshold N1 of the number of times and a high threshold N2 of the number of times for triggering the high threshold of the busbar voltage by the busbar voltage value, and the high threshold N2 of the number of times being greater than the low threshold N1 of the number of times; in response to the brushless DC motor performing the slow braking process and the number of times the busbar voltage value triggering the high threshold of the busbar voltage being greater than the high threshold N2 of the number of times, the PWM modulation module outputs the PWM modulation signals with the gradual decreasing duty cycle to the three lower transistors of the three-phase inverter, until the number of times the busbar voltage value triggering the high threshold of the busbar voltage is between the low threshold N1 of the number of times and the high threshold N2 of the number of times; in response to the brushless DC motor performing the slow braking process and the number of times the busbar voltage value triggering the high threshold of the busbar voltage being less than the low threshold N1 of the number of times, the PWM modulation module outputs the PWM modulation signals with the gradual increasing duty cycle to the three lower transistors of the three-phase inverter, until the number of times the busbar voltage value triggering the high threshold of the busbar voltage is between the low threshold N1 of the number of times and the high threshold N2 of the number of times.

In an embodiment, a range of the low threshold N1 is 5-10 times, and a range of the high threshold N2 is 20-50 times.

In an embodiment, the high threshold of the busbar voltage is a withstand voltage value of the busbar circuit, and the low threshold of the busbar voltage is a minimum threshold for ensuring braking efficiency when the brushless DC motor is braked.

In some embodiments, the present disclosure provides a brushless DC motor braking method performed by a brushless DC motor braking system, includes:

a brushless DC motor braking with duty cycle of PWM modulation signals of three upper transistors of a three-phase inverter as zero and duty cycle of PWM modulation signals of three lower transistors of the three-phase inverter as an initial duty cycle of the PWM modulation signals;

converting an analog voltage signal sampled by a voltage sampling module into a digital voltage signal through an ADC module during a braking process, wherein the digital voltage signal is a busbar voltage value;

determining whether the busbar voltage value is between a high threshold of the busbar voltage and a low threshold of the busbar voltage in real time through a computing module;

in response to the busbar voltage value triggering the high threshold of the busbar voltage, a PWM modulation module outputting PWM modulation signals with duty cycle of all six switch transistors of the three-phase inverter being zero;

in response to the busbar voltage value triggering the low threshold of the busbar voltage, the PWM modulation module outputting PWM modulation signals with duty cycle of the PWM modulation signals of the three upper transistors of the three-phase inverter being zero and duty cycle of the PWM modulation signals of the three lower transistors of the three-phase inverter being the initial duty cycle of the PWM modulation signals;

during a slow braking process of the brushless DC motor, in response to the busbar voltage value triggering the high threshold of the busbar voltage N0 times within duration time T0, the PWM modulation module outputting PWM modulation signals with decreasing duty cycle to the three lower transistors of the three-phase inverter;

in response to the busbar voltage value triggering the low threshold of the busbar voltage N0 times within duration time T0, the PWM modulation module outputting PWM modulation signals with increasing duty cycle to the three lower transistors of the three-phase inverter; and controlling the busbar voltage value to be between the high threshold of the busbar voltage and low threshold of the busbar voltage through a brake control module, for controlling the brushless DC motor to perform slow braking until stopping.

Alternatively, the brushless DC motor braking method includes:

a brushless DC motor braking with duty cycle of the PWM modulation signals of three upper transistors of a three-phase inverter as zero and duty cycle of the PWM modulation signals of three lower transistors of the three-phase inverter as an initial duty cycle of the PWM modulation signals;

converting an analog voltage signal sampled by a voltage sampling module into a digital voltage signal through an ADC module during a braking process, wherein the digital voltage signal is a busbar voltage value;

determining whether the busbar voltage value is between a high threshold of the busbar voltage and a low threshold of the busbar voltage in real time through a computing module;

in response to the busbar voltage value triggering the high threshold of the busbar voltage, a PWM modulation module outputting PWM modulation signals with duty cycle of all six switch transistors of the three-phase inverter being zero;

in response to the busbar voltage value triggering the low threshold of the busbar voltage, the PWM modulation module outputting PWM modulation signals with duty cycle of the three upper transistors of the three-phase inverter being zero and duty cycle of the three lower transistors of the three-phase inverter being the initial duty cycle of the PWM modulation signals;

in response to the number of times the busbar voltage value triggering the high threshold of the busbar voltage within duration time T1 being greater than a high threshold N2 of the number of times, the PWM modulation module outputting PWM modulation signals with the gradual decreasing duty cycle to three lower transistors of the three-phase inverter, until the number of times the busbar voltage value triggering the high threshold of the busbar voltage within duration time T1 is between the low threshold N1 of the number of times and the high threshold N2 of the number of times;

in response to the number of times the busbar voltage value triggering the high threshold of the busbar voltage within duration time T1 being less than a low threshold N1 of the number of times, the PWM modulation module outputting PWM modulation signals with the gradual increasing duty cycle to three lower transistors of the three-phase inverter, until the number of times the busbar voltage value triggering the high threshold of the busbar voltage within duration time T1 is between the low threshold N1 of the number of times and the high threshold N2 of the number of times; and controlling the busbar voltage value to be between the high threshold of the busbar voltage and low threshold of the busbar voltage through a brake control module, for controlling the brushless DC motor to perform slow braking until stopping.

In an embodiment, in response to the busbar voltage value triggering the high threshold of the busbar voltage more than the high threshold N2 of the number of times within duration time T1, the PWM modulation module outputs PWM modulation signals with duty cycle of the three upper transistors of the three-phase inverter being zero and the gradual decreasing duty cycle of 5% for the three lower transistors of the three-phase inverter; in response to the number of times the busbar voltage value triggering the high threshold of the busbar voltage being less than the low threshold N1 of the number of times within duration time T1, the PWM modulation module outputs PWM modulation signals with the duty cycle of the three upper transistors of the three-phase inverter being zero and a gradual increase of 5% duty cycle of the three lower transistors.

In an embodiment, a range of the duration time T0 is 10 ms to 100 ms, and a range of N0 is 5 to 20 times.

In an embodiment, a range of N1 is 5-10 times, a range of N2 is 20-50 times, and a range of T1 is 10 ms to 100 ms.

In an embodiment, the high threshold of the busbar voltage is a withstand voltage value of the busbar circuit, and the low threshold of the busbar voltage is a minimum threshold for ensuring braking efficiency when the brushless DC motor is braked.

In some embodiments, the present disclosure provides a brushless DC motor braking system, The brushless DC motor braking system includes a brushless DC motor, a processor and a memory storing executable instructions of the processor. When the instructions are executed by the processor, the processor is configured to perform:
braking with duty cycle of PWM modulation signals of three upper transistors of a three-phase inverter as zero and duty cycle of PWM modulation signals of three lower transistors of the three-phase inverter as an initial duty cycle of the PWM modulation signals;
converting an analog voltage signal into a digital voltage signal through an ADC module during a braking process, wherein the digital voltage signal is a busbar voltage value;
determining whether the busbar voltage value is between a high threshold of the busbar voltage and a low threshold of the busbar voltage in real time;
in response to the busbar voltage value triggering the high threshold of the busbar voltage, outputting PWM modulation signals with duty cycle of all six switch transistors of the three-phase inverter being zero;
in response to the busbar voltage value triggering the low threshold of the busbar voltage, outputting PWM modulation signals with duty cycle of the PWM modulation signals of the three upper transistors of the three-phase inverter being zero and duty cycle of the PWM modulation signals of the three lower transistors of the three-phase inverter being the initial duty cycle of the PWM modulation signals;
during a slow braking process of the brushless DC motor, in response to the busbar voltage value triggering the high threshold of the busbar voltage N0 times within duration time T0, outputting PWM modulation signals with decreasing duty cycle to the three lower transistors of the three-phase inverter;
in response to the busbar voltage value triggering the low threshold of the busbar voltage N0 times within duration time T0, outputting PWM modulation signals with increasing duty cycle to the three lower transistors of the three-phase inverter; and
controlling the busbar voltage value to be between the high threshold of the busbar voltage and low threshold of the busbar voltage, for controlling the brushless DC motor to perform slow braking until stopping.

Alternatively, the processor is configured to perform:
braking with duty cycle of the PWM modulation signals of three upper transistors of a three-phase inverter as zero and duty cycle of the PWM modulation signals of three lower transistors of the three-phase inverter as an initial duty cycle of the PWM modulation signals;
converting an analog voltage signal into a digital voltage signal through an ADC module during a braking process, wherein the digital voltage signal is a busbar voltage value;
determining whether the busbar voltage value is between a high threshold of the busbar voltage and a low threshold of the busbar voltage in real time;
in response to the busbar voltage value triggering the high threshold of the busbar voltage, a PWM modulation module outputting PWM modulation signals with duty cycle of all six switch transistors of the three-phase inverter being zero;
in response to the busbar voltage value triggering the low threshold of the busbar voltage, outputting PWM modulation signals with duty cycle of the three upper transistors of the three-phase inverter being zero and duty cycle of the three lower transistors of the three-phase inverter being the initial duty cycle of the PWM modulation signals;
in response to the number of times the busbar voltage value triggering the high threshold of the busbar voltage within duration time T1 being greater than a high threshold N2 of the number of times, outputting PWM modulation signals with the gradual decreasing duty cycle to three lower transistors of the three-phase inverter, until the number of times the busbar voltage value triggering the high threshold of the busbar voltage within duration time T1 is between the low threshold N1 of the number of times and the high threshold N2 of the number of times;
in response to the number of times the busbar voltage value triggering the high threshold of the busbar voltage within duration time T1 being less than a low threshold N1 of the number of times, outputting PWM modulation signals with the gradual increasing duty cycle to three lower transistors of the three-phase inverter, until the number of times the busbar voltage value triggering the high threshold of the busbar voltage within duration time T1 is between the low threshold N1 of the number of times and the high threshold N2 of the number of times; and
controlling the busbar voltage value to be between the high threshold of the busbar voltage and low threshold of the busbar voltage, for controlling the brushless DC motor to perform slow braking until stopping.

In an embodiment, in response to the busbar voltage value triggering the high threshold of the busbar voltage more than the high threshold N2 of the number of times within duration time T1, the PWM modulation module outputs PWM modulation signals with duty cycle of the three upper transistors of the three-phase inverter being zero and the gradual decreasing duty cycle of 5% for the three lower transistors of the three-phase inverter; in response to the number of times the busbar voltage value triggering the high threshold of the busbar voltage being less than the low threshold N1 of the number of times within duration time T1, the PWM modulation module outputs PWM modulation signals with the duty cycle of the three upper transistors of the three-phase inverter being zero and a gradual increase of 5% duty cycle of the three lower transistors.

In an embodiment, a range of the duration time T0 is 10 ms to 100 ms, and a range of N0 is 5 to 20 times.

In an embodiment, a range of N1 is 5-10 times, a range of N2 is 20-50 times, and a range of T1 is 10 ms to 100 ms.

In an embodiment, the high threshold of the busbar voltage is a withstand voltage value of the busbar circuit, and the low threshold of the busbar voltage is a minimum threshold for ensuring braking efficiency when the brushless DC motor is braked.

Referring to FIG. 4 to FIG. 9, a brushless DC motor braking system includes a DC power supply 1, a three-phase inverter 2, and a controller 3. The DC power supply 1 is electrically connected to the three-phase inverter 2 through a busbar circuit 5. The three-phase inverter 2 is electrically connected to a brushless DC motor 4. The controller 3 is electrically connected to three-phase inverter 2 to control and drive the operation of the brushless DC motor 4. The controller 3 can be a central processing unit to control the operation of the brushless DC motor braking system. A voltage sampling module 6 is electrically connected between positive and negative poles of the DC power supply 1 for collecting a busbar voltage value of the busbar circuit 5 when the brushless DC motor 4 brakes. The voltage sampling module 6 can be a sensor or a chip embedded with a processor. The controller 3 includes a brake control module 7 electrically connected to the voltage sampling module 6 and internally preset with a high threshold of the busbar voltage and a low threshold of the busbar voltage. The brake control module 7 is a device that achieves braking through electronic control such as Anti lock Brake System (ABS) and Electronic Stability Control System (ESP). In response to the busbar voltage value triggering the high threshold of the busbar voltage, the brake control module 7 controls all six switch transistors of the three-phase inverter 2 to turn off. In response to the busbar voltage value triggering the low threshold of the busbar voltage, the brake control module 7 controls three upper transistors of three-phase inverter 2 to turn off and three lower transistors to turn on. The brake control module 7 controls the busbar voltage value to be between the high threshold of the busbar voltage and the low threshold of the busbar voltage, for controlling the brushless DC motor 4 to perform slow braking until stopping. The high threshold of the busbar voltage is a withstand voltage value of the busbar circuit, and once the withstand voltage value is exceeded, it can easily cause damage to circuit components and circuits. The low threshold of the busbar voltage is a minimum threshold for ensuring braking efficiency when the brushless DC motor is braked. Below the minimum threshold, it can easily lead to longer braking time, greatly reducing braking efficiency, and reducing user experience.

Figure 4:
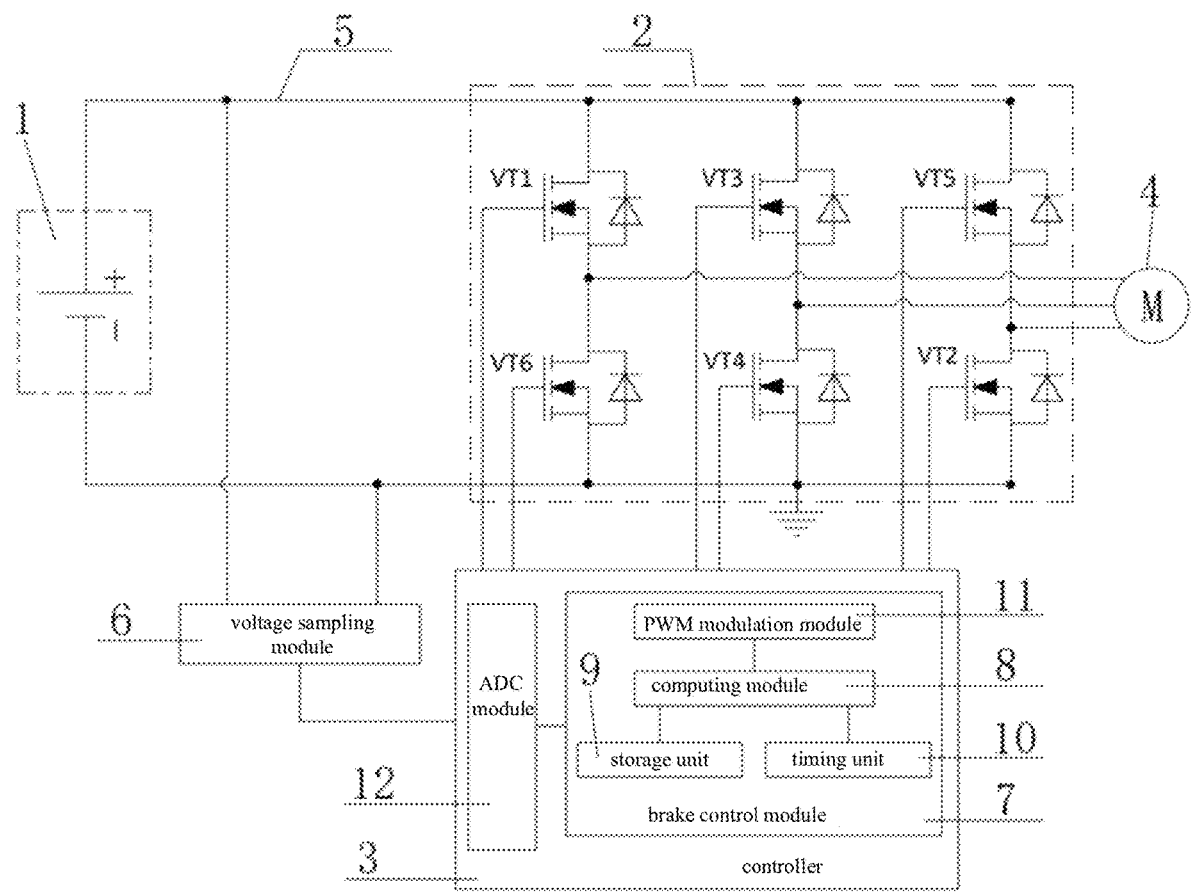
FIG. 4 is a structural diagram of a brushless DC motor braking system of the present disclosure.
Figure 5:
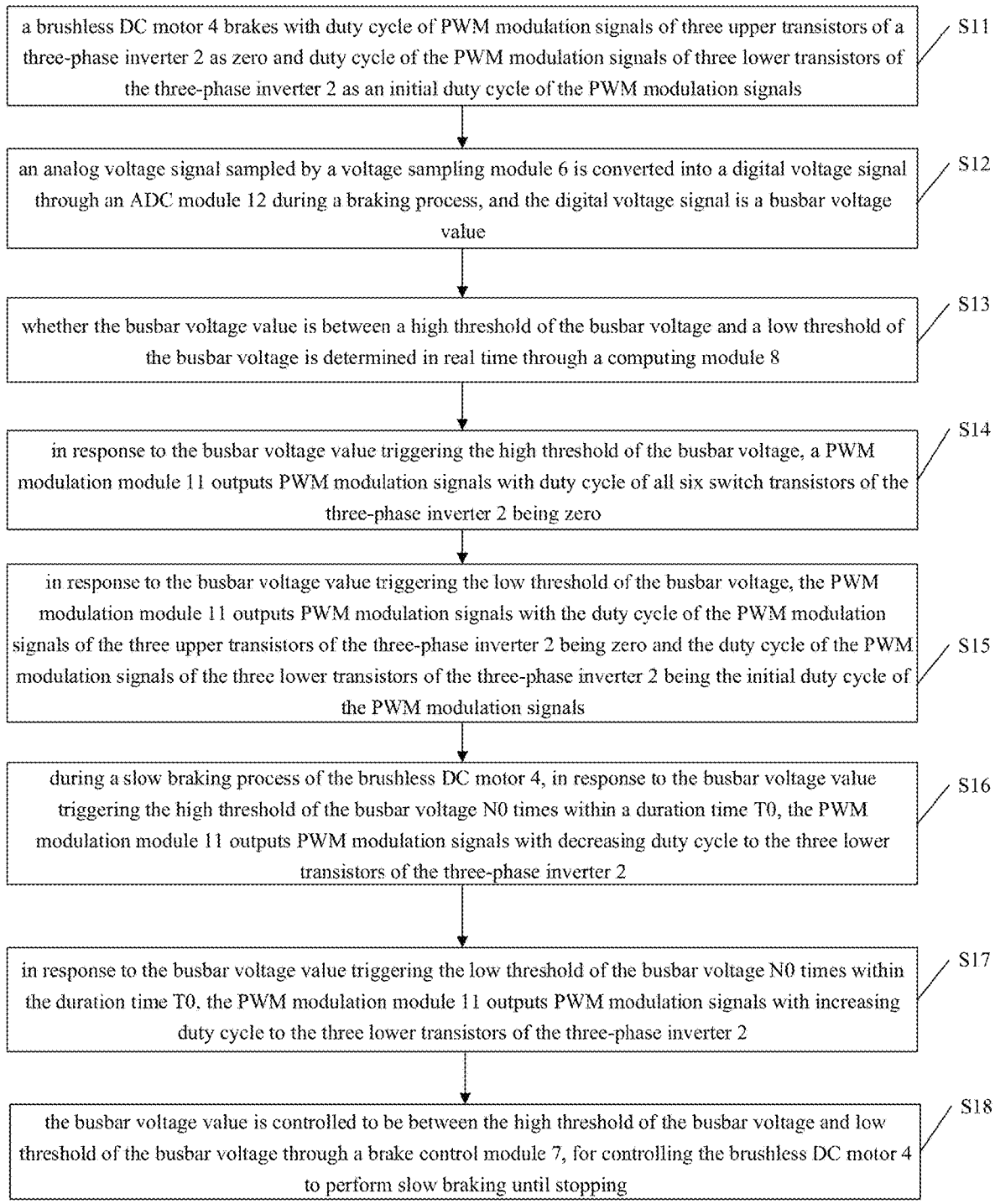
FIG. 5 is a flow chart of a brushless DC motor braking method.
Figure 6:
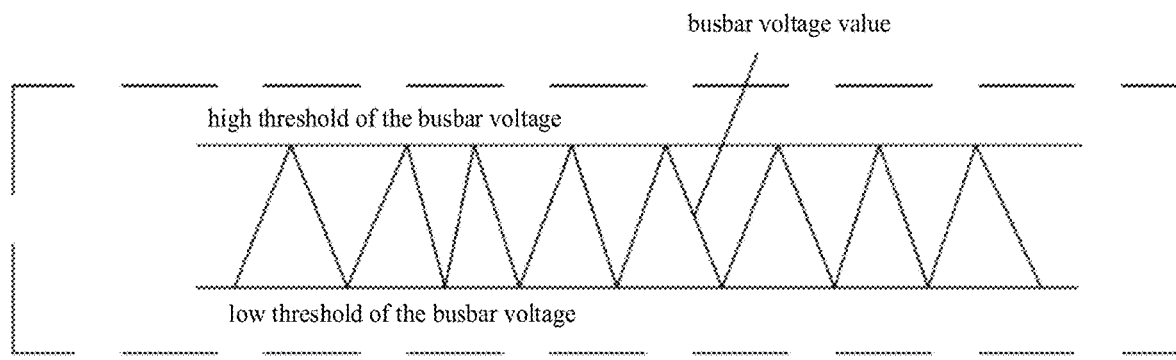
FIG. 6 is a waveform diagram of the busbar voltage control of a brushless DC motor braking system of the present disclosure during braking.
Figure 7:
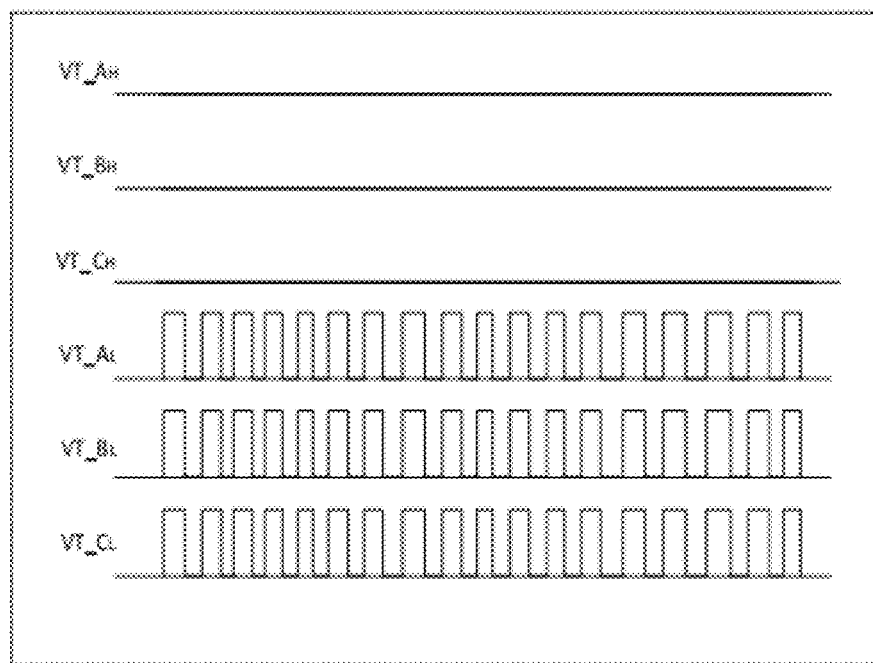
Figure 8:
FIG. 8 is a waveform diagram of PWM modulation signals output by a PWM modulation module of the present disclosure, with three lower transistors of a three-phase inverter turning off.
Figure 9:
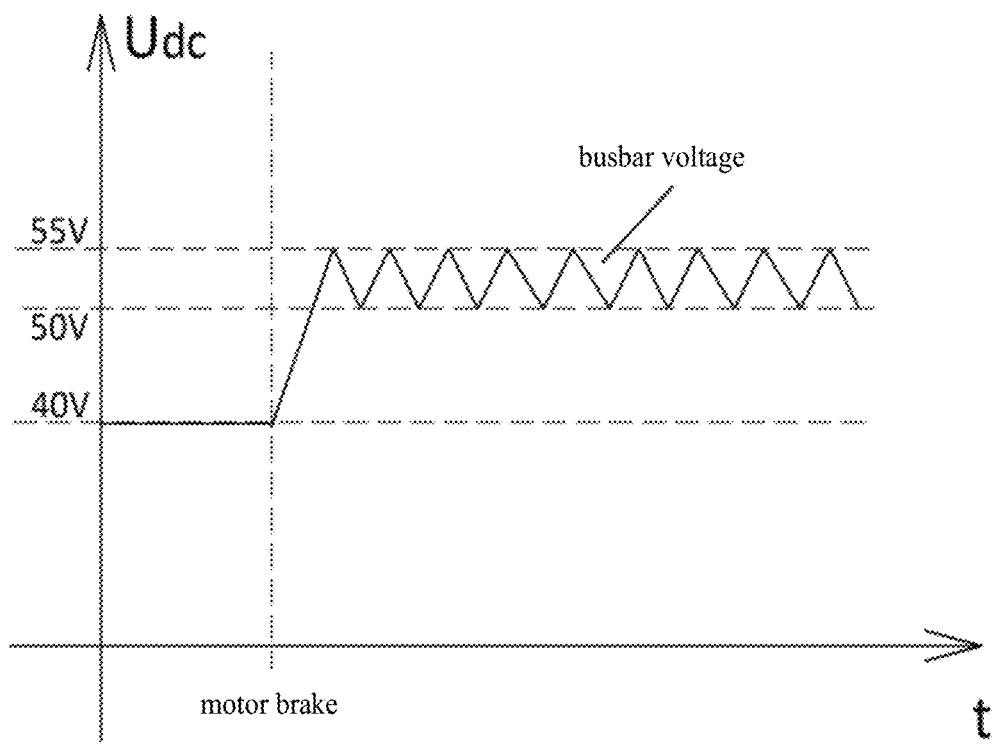
FIG. 9 is a waveform diagram of a busbar voltage during a braking process of a brushless DC motor of the present disclosure.

Referring to FIG. 4, the brake control module 7 includes a computing module 8, a storage unit 9, a timing unit 10, and a PWM modulation module 11. The computing module 8 is electrically connected to the voltage sampling module 6 through an ADC module 12, both the storage unit 9 and the timing unit 10 are electrically connected to the computing module 8, and the computing module 8 is electrically connected to the three-phase inverter 2 through the PWM modulation module 11. The storage unit 9 is preset with the high threshold of the busbar voltage and low threshold of the busbar voltage. In some embodiments, the computing module 8, the timing unit 10, the PWM modulation module 11 and the ADC module 12 can be integrated into one processor, or are different processors. The ADC module is an analog-to-digital converter. The storage unit 9 can be a memory, or a computer-readable signal medium, a computer-readable storage medium, or any combination of the two.

In the embodiment, the ADC module 12 is configured to convert an analog voltage signal sampled by the voltage sampling module 6 into a digital voltage signal, and the digital voltage signal is the busbar voltage value. The computing module 8 is configured to determine whether the busbar voltage value triggers the high threshold of the busbar voltage or low threshold of the busbar voltage, and to count the number of times the busbar voltage value triggers the high threshold of the busbar voltage or low threshold of the busbar voltage. The timing unit 10 is configured to control the computing module 8 to detect a duration time of the busbar voltage value triggering the high threshold of the busbar voltage or low threshold of the busbar voltage of the busbar voltage. The PWM modulation module 11 generates corresponding PWM modulation signals based on different states of the busbar voltage detected by the computing module 8, and the PWM modulation signals are configured to control the six switch transistors of the three-phase inverter 2 to turn off or turn on off, and then control the brushless DC motor 4 to perform slow braking process. The six switch transistors include three lower transistors and three upper transistors.

Referring to FIG. 6 to FIG. 9, during the slow braking process of the brushless DC motor 4, in response to the busbar voltage value triggering the high threshold of the busbar voltage N0 times within a duration time T0, the brake control module 7 controls the duty cycle of the PWM modulation signals of the three lower transistors of the three-phase inverter 2 to be decreased; in response to the busbar voltage value triggering the low threshold of the busbar voltage N0 times within the duration time T0, the brake control module 7 controls the duty cycle of the PWM modulation signals of the three lower transistors of the three-phase inverter 2 to be increased.

In the embodiments, the storage unit 9 is preset with an initial duty cycle of the PWM modulation signals of the three lower transistors of the three-phase inverter 2 when the brushless DC motor 4 brakes, and the duty cycle of the PWM modulation signals of the three upper transistors of the three-phase inverter 2 is always zero.

Continuing referring to FIG. 4, the storage unit 9 is preset with a low threshold N1 of the number of times and a high threshold N2 of the number of times for triggering the high threshold of the busbar voltage by the busbar voltage value, and the high threshold N2 of the number of times greater than the low threshold N1 of the number of times. In response to the brushless DC motor 4 performing the slow braking process and the number of times the busbar voltage value triggering the high threshold of the busbar voltage being greater than the high threshold N2 of the number of times, the PWM modulation module 11 outputs the PWM modulation signals with the gradual decreasing duty cycle to the three lower transistors of the three-phase inverter 2, until the number of times the busbar voltage value triggering the high threshold of the busbar voltage is between the low threshold N1 of the number of times and the high threshold N2 of the number of times. In response to the brushless DC motor 4 performing the slow braking process and the number of times the busbar voltage value triggering the high threshold of the busbar voltage being less than the low threshold N1 of the number of times, the PWM modulation module 11 outputs the PWM modulation signals with the gradual increasing duty cycle to the three lower transistors of the three-phase inverter 2, until the number of times the busbar voltage value triggering the high threshold of the busbar voltage is between the low threshold N1 of the number of times and the high threshold N2 of the number of times.

(1). The present disclosure provides a brushless DC motor braking method, including the following operations illustrated in FIG. 5.

At block S11: a brushless DC motor 4 brakes with duty cycle of PWM modulation signals of three upper transistors of a three-phase inverter 2 as zero and duty cycle of the PWM modulation signals of three lower transistors of the three-phase inverter 2 as an initial duty cycle of the PWM modulation signals.

At block S12: an analog voltage signal sampled by a voltage sampling module 6 is converted into a digital voltage signal through an ADC module 12 during a braking process, and the digital voltage signal is a busbar voltage value.

At block S13: whether the busbar voltage value is between a high threshold of the busbar voltage and a low threshold of the busbar voltage is determined in real time through a computing module 8.

At block S14: in response to the busbar voltage value triggering the high threshold of the busbar voltage, a PWM modulation module 11 outputs PWM modulation signals with duty cycle of all six switch transistors of the three-phase inverter 2 being zero.

At block S15: in response to the busbar voltage value triggering the low threshold of the busbar voltage, the PWM modulation module 11 outputs PWM modulation signals with the duty cycle of the PWM modulation signals of the three upper transistors of the three-phase inverter 2 being zero and the duty cycle of the PWM modulation signals of the three lower transistors of the three-phase inverter 2 being the initial duty cycle of the PWM modulation signals.

At block S16: during a slow braking process of the brushless DC motor 4, in response to the busbar voltage value triggering the high threshold of the busbar voltage N0 times within a duration time T0, the PWM modulation module 11 outputs PWM modulation signals with decreasing duty cycle to the three lower transistors of the three-phase inverter 2.

At block S17: in response to the busbar voltage value triggering the low threshold of the busbar voltage N0 times within the duration time T0, the PWM modulation module 11 outputs PWM modulation signals with increasing duty cycle to the three lower transistors of the three-phase inverter 2.

At block S18: the busbar voltage value is controlled to be between the high threshold of the busbar voltage and low threshold of the busbar voltage through a brake control module 7, for controlling the brushless DC motor 4 to perform slow braking until stopping.

A range of the duration time T0 is 10 ms to 100 ms, and a range of N0 is 5 to 20 times.

A working principle of the above brushless DC motor 4 braking method is as following.

Referring to FIG. 6 to FIG. 9, it is assumed that a battery pack voltage is 40V, the busbar voltage value is recorded as Udc, the high threshold of the busbar voltage is 55V, the low threshold of the busbar voltage is 50V, a value of the duration time T0 is 50 ms, a value of the N0 is 10 times, and the initial duty cycle of the PWM modulation signals is 50%.

At block S21: a brushless DC motor 4 brakes with duty cycle of the PWM modulation signals of three upper transistors of a three-phase inverter 2 as zero and duty cycle of the PWM modulation signals of three lower transistors of the three-phase inverter 2 as an initial duty cycle of the PWM modulation signals.

At block S22: an analog voltage signal sampled by a voltage sampling module 6 is converted into a digital voltage signal through an ADC module 12 during a braking process, and the digital voltage signal is a busbar voltage value Udc.

At block S23: whether the Udc is between 50V and 55V is determined in real time through a computing module 8.

At block S24: in response to the Udc rising to 55V, a PWM modulation module 11 outputs PWM modulation signals with duty cycle for all six switch transistors of the three-phase inverter 2 being zero; and in response to the Udc dropping to 50V, the PWM modulation module 11 outputs PWM modulation signals with the duty cycle of the three upper transistors of three-phase inverter 2 being zero and the duty cycle of the PWM modulation signals of the three lower transistors of inverter 2 being 50%.

At block S25: during a slow braking process the brushless DC motor 4, in response to the Udc rising to 55V 10 times within 50 ms, the PWM modulation module 11 outputs PWM modulation signals with decreasing duty cycle to the three lower transistors of the three-phase inverter 2, and the 10 times is continuous or discontinuous.

At block S26: during the slow braking process the brushless DC motor 4, in response to the Udc dropping to 50V 10 times within 50 ms, the PWM modulation module 11 outputs PWM modulation signals with increasing duty cycle to the three lower transistors of the three-phase inverter 2.

At block S27: the Udc is controlled to be between 50V and 55V through a brake control module 7, for controlling the brushless DC motor 4 to perform slow braking until stopping.

In the method, the busbar voltage value is controlled to always be between the high threshold of the busbar voltage and low threshold of the busbar voltage through the brake control module 7; and different PWM modulation signals are used to control the brushless DC motor 4 to perform slow braking until stopping based on different busbar voltage states. Thus, in a first aspect, the method can ensure that the busbar voltage value continues to be maintained between the high threshold of the busbar voltage and low threshold of the busbar voltage, thereby protecting electronic components and circuits and extending their service life; in a second aspect, this method can avoid the hard braking method of direct conduction of the three lower transistors of the three-phase inverter 2 in related arts, thereby significantly improving the braking feel of the brushless DC motor 4.

Figure 10:
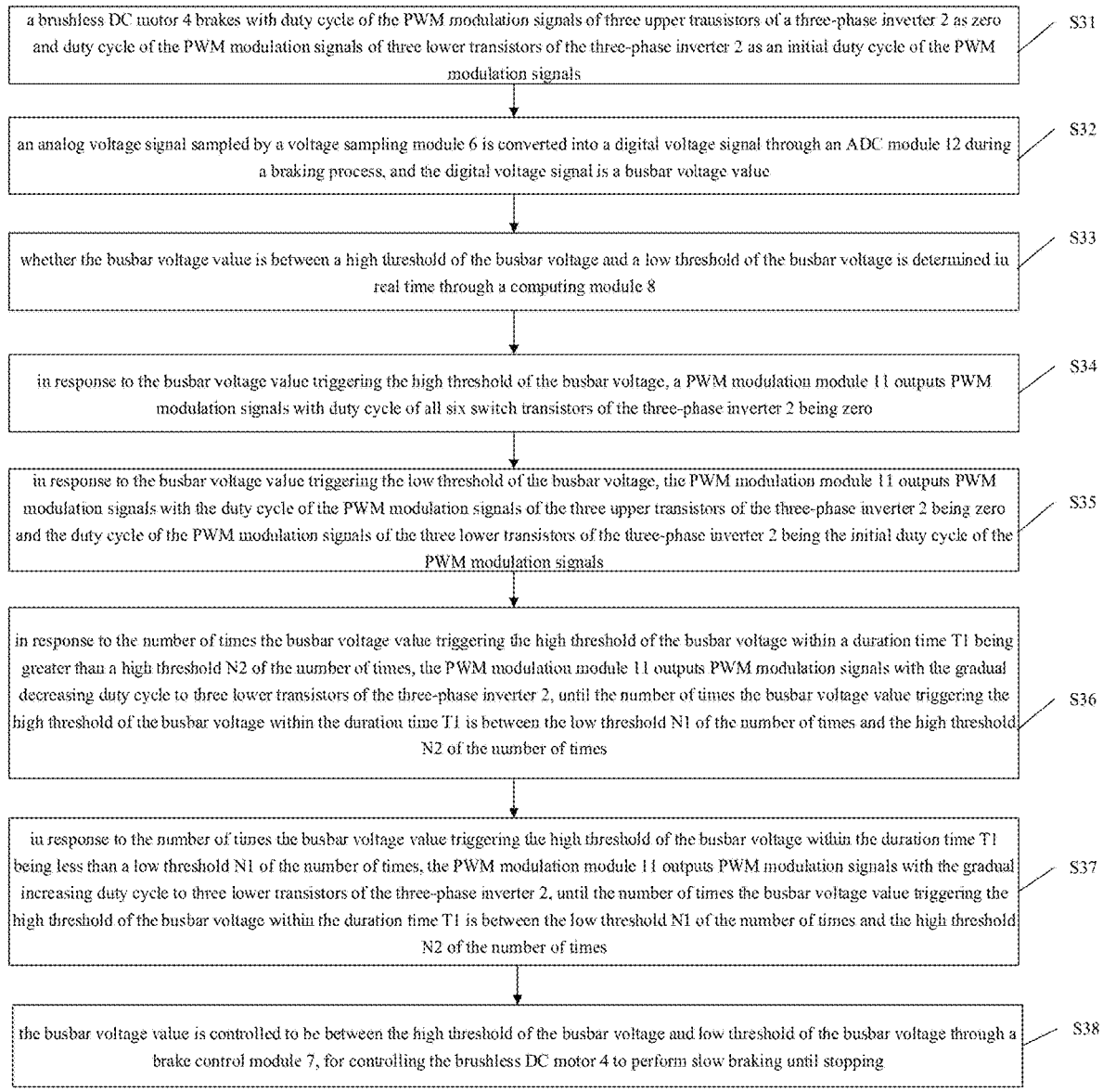
FIG. 10 is a flow chart of another brushless DC motor braking method.

(2) The present disclosure provides another brushless DC motor braking method, including the following operations illustrated in FIG. 10.

At block S31: a brushless DC motor 4 brakes with duty cycle of the PWM modulation signals of three upper transistors of a three-phase inverter 2 as zero and duty cycle of the PWM modulation signals of three lower transistors of the three-phase inverter 2 as an initial duty cycle of the PWM modulation signals.

At block S32: an analog voltage signal sampled by a voltage sampling module 6 is converted into a digital voltage signal through an ADC module 12 during a braking process, and the digital voltage signal is a busbar voltage value.

At block S33: whether the busbar voltage value is between a high threshold of the busbar voltage and a low threshold of the busbar voltage is determined in real time through a computing module 8.

At block S34: in response to the busbar voltage value triggering the high threshold of the busbar voltage, a PWM modulation module 11 outputs PWM modulation signals with duty cycle of all six switch transistors of the three-phase inverter 2 being zero.

At block S35: in response to the busbar voltage value triggering the low threshold of the busbar voltage, the PWM modulation module 11 outputs PWM modulation signals with the duty cycle of the PWM modulation signals of the three upper transistors of the three-phase inverter 2 being zero and the duty cycle of the PWM modulation signals of the three lower transistors of the three-phase inverter 2 being the initial duty cycle of the PWM modulation signals.

At block S36: in response to the number of times the busbar voltage value triggering the high threshold of the busbar voltage within a duration time T1 being greater than a high threshold N2 of the number of times, the PWM modulation module 11 outputs PWM modulation signals with the gradual decreasing duty cycle to three lower transistors of the three-phase inverter 2, until the number of times the busbar voltage value triggering the high threshold of the busbar voltage within the duration time T1 is between the low threshold N1 of the number of times and the high threshold N2 of the number of times.

At block S37: in response to the number of times the busbar voltage value triggering the high threshold of the busbar voltage within the duration time T1 being less than a low threshold N1 of the number of times, the PWM modulation module 11 outputs PWM modulation signals with the gradual increasing duty cycle to three lower transistors of the three-phase inverter 2, until the number of times the busbar voltage value triggering the high threshold of the busbar voltage within the duration time T1 is between the low threshold N1 of the number of times and the high threshold N2 of the number of times.

At block S38: the busbar voltage value is controlled to be between the high threshold of the busbar voltage and low threshold of the busbar voltage through a brake control module 7, for controlling the brushless DC motor 4 to perform slow braking until stopping.

The range of N1 is 5-10 times, the range of N2 is 20-50 times, and the range of T1 is 10 ms to 100 ms.

In the embodiments, when the number of times the busbar voltage value triggering the high threshold of the busbar voltage within the duration time T1 being greater than the high threshold N2 of the number of times, the PWM modulation module 11 outputs PWM modulation signals with the duty cycle of the three upper transistors of the three-phase inverter 2 being zero and the duty cycle of the three lower transistors of the three-phase inverter 2 gradually decreasing by 5%.

In response to the number of times the busbar voltage value triggering the high threshold of the busbar voltage within the duration time T1 being less than the low threshold N1, the PWM modulation module 11 outputs PWM modulation signals with the duty cycle of the three upper transistors of three-phase inverter 2 being zero and the duty cycle of the three lower transistors being increasing by 5%.

A working principle of the above brushless DC motor 4 braking method is as following.

Referring to FIG. 6 to FIG. 9, it is assumed that a battery pack voltage is 40V, the busbar voltage value is recorded as Udc, the high threshold of the busbar voltage is 55V, the low threshold of the busbar voltage is 50V, a value of the duration time T1 is 50 ms, a value of the N1 is 5 times, a value of the N2 is 20 times, and the initial duty cycle of the PWM modulation signals is 50%.

At block S41: a brushless DC motor 4 brakes with duty cycle of the PWM modulation signals of three upper transistors of a three-phase inverter 2 as zero and duty cycle of the PWM modulation signals of three lower transistors of the three-phase inverter 2 as an initial duty cycle of the PWM modulation signals.

At block S42: an analog voltage signal sampled by a voltage sampling module 6 is converted into a digital voltage signal through an ADC module 12 during a braking process, and the digital voltage signal is a busbar voltage value Udc.

At block S43: whether the Udc is between 50V and 55V through is determined in real time through a computing module 8.

At block S44: in response to the Udc rising to 55V, a PWM modulation module 11 outputs PWM modulation signals with duty cycle of all six switch transistors of the three-phase inverter 2 being zero; and in response to the Udc dropping to 50V, the PWM modulation module 11 outputs PWM modulation signals with duty cycle of the three upper transistors of three-phase inverter 2 being zero and duty cycle of the three lower transistors of inverter 2 being 50%.

At block S45: in response to the Udc rising to 55V 20 times within 50 ms, the PWM modulation module 11 outputs PWM modulation signals with the duty cycle of the three upper transistors of three-phase inverter 2 being zero and the duty cycle of the three lower transistors of the three-phase inverter 2 being gradually decreasing by 5%, until the number of times the Udc rises to 55V within 50 ms is between 5 and 20.

At block S46: in response to the number of times the Udc drops to 50V within 50 ms being less than 5, the PWM modulation module 11 outputs PWM modulation signals with the duty cycle of the three upper transistors of three-phase inverter 2 being zero and the duty cycle of the three lower transistors gradually increasing by 5%, until the number of times the Udc drops to 50V within 50 ms is between 5 and 20.

At block S47: the Udc is controlled to be between 50V and 55V through a brake control module 7 to control the brushless DC motor 4 to perform slow braking until stopping.

The above method (2) further optimizes the method (1). While ensuring that the busbar voltage value is between the high threshold of the busbar voltage and the low threshold of the busbar voltage, the PWM modulation signals are further finely controlled to control the brushless DC motor 4 to perform slow braking until stopping. The method not only protects electronic components and circuits, extends their service life, but also greatly improves braking efficiency, and at the same time, further improves the brake feel of the brushless DC motor 4, thereby greatly improving the user experience.

Figure 11:
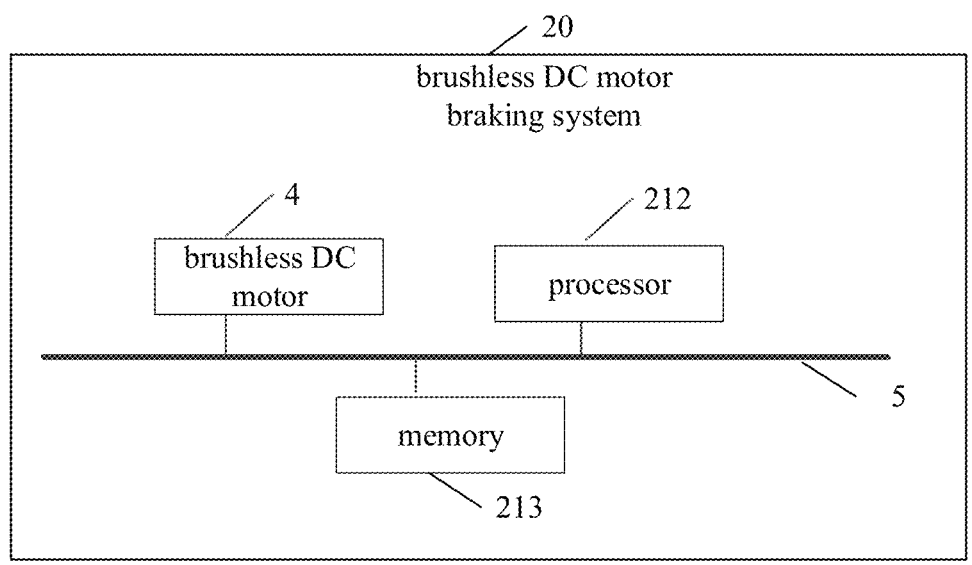
FIG. 11 is a structural diagram of a brushless DC motor braking system.

In some embodiments, referring to FIG. 11, the present disclosure provides a brushless DC motor braking system 20. The brushless DC motor braking system can include a processor 212, a memory 213 storing executable instructions of the processor 212 and a brushless DC motor 4. Further, the electronic device 20 can also include a busbar circuit 5 configured to connect the processor 212, the memory 213 and the memory 213 and the brushless DC motor 4. The brushless DC motor 4 is similar to the above brushless DC motor 4.

In some embodiments of the present disclosure, the above processor 212 can include at least one of an application specific integrated circuit (ASIC), a digital signal processor (DSP), a digital signal processing device (DSPD), a prog RAM logic device (PLD), a field prog RAM gate array (FPGA) central processing unit (CPU), a controller, a microcontroller and a micro-processor. It can be understood that for different devices, the electronic device used to realize the above processor functions can also be other, and the embodiments of the present disclosure are not specifically limited. The electronic device 20 may also include the memory 213 connected to the processor 212. The memory 213 is configured to store executable program codes, and the executable program codes include computer operation instructions. The memory 213 may also include a high-speed RAM memory, or a non-volatile memory, such as at least two disk memories.

In some embodiments of the present disclosure, the busbar circuit 5 is configured to connect the brushless DC motor 4, the processor 212, the memory 213 and mutual communication between these components.

In some embodiments of the present disclosure, the memory 213 is configured to store instructions and data. When the instructions are executed by the processor, the processor is configured to perform: braking with duty cycle of PWM modulation signals of three upper transistors of a three-phase inverter as zero and duty cycle of PWM modulation signals of three lower transistors of the three-phase inverter as an initial duty cycle of the PWM modulation signals; converting an analog voltage signal into a digital voltage signal through an ADC module during a braking process, wherein the digital voltage signal is a busbar voltage value; determining whether the busbar voltage value is between a high threshold of the busbar voltage and a low threshold of the busbar voltage in real time; in response to the busbar voltage value triggering the high threshold of the busbar voltage, outputting PWM modulation signals with duty cycle of all six switch transistors of the three-phase inverter being zero; in response to the busbar voltage value triggering the low threshold of the busbar voltage, outputting PWM modulation signals with duty cycle of the PWM modulation signals of the three upper transistors of the three-phase inverter being zero and duty cycle of the PWM modulation signals of the three lower transistors of the three-phase inverter being the initial duty cycle of the PWM modulation signals; during a slow braking process of the brushless DC motor, in response to the busbar voltage value triggering the high threshold of the busbar voltage N0 times within a duration time T0, outputting PWM modulation signals with decreasing duty cycle to the three lower transistors of the three-phase inverter; in response to the busbar voltage value triggering the low threshold of the busbar voltage N0 times within the duration time T0, outputting PWM modulation signals with increasing duty cycle to the three lower transistors of the three-phase inverter; and controlling the busbar voltage value to be between the high threshold of the busbar voltage and low threshold of the busbar voltage, for controlling the brushless DC motor to perform slow braking until stopping.

Alternatively, When the instructions are executed by the processor, the processor is configured to perform: braking with duty cycle of the PWM modulation signals of three upper transistors of a three-phase inverter as zero and duty cycle of the PWM modulation signals of three lower transistors of the three-phase inverter as an initial duty cycle of the PWM modulation signals; converting an analog voltage signal into a digital voltage signal through an ADC module during a braking process, wherein the digital voltage signal is a busbar voltage value; determining whether the busbar voltage value is between a high threshold of the busbar voltage and a low threshold of the busbar voltage in real time; in response to the busbar voltage value triggering the high threshold of the busbar voltage, a PWM modulation module outputting PWM modulation signals with duty cycle of all six switch transistors of the three-phase inverter being zero; in response to the busbar voltage value triggering the low threshold of the busbar voltage, outputting PWM modulation signals with duty cycle of the three upper transistors of the three-phase inverter being zero and duty cycle of the three lower transistors of the three-phase inverter being the initial duty cycle of the PWM modulation signals; in response to the number of times the busbar voltage value triggering the high threshold of the busbar voltage within a duration time T1 being greater than a high threshold N2 of the number of times, outputting PWM modulation signals with the gradual decreasing duty cycle to three lower transistors of the three-phase inverter, until the number of times the busbar voltage value triggering the high threshold of the busbar voltage within the duration time T1 is between the low threshold N1 of the number of times and the high threshold N2 of the number of times; in response to the number of times the busbar voltage value triggering the high threshold of the busbar voltage within the duration time T1 being less than a low threshold N1 of the number of times, outputting PWM modulation signals with the gradual increasing duty cycle to three lower transistors of the three-phase inverter, until the number of times the busbar voltage value triggering the high threshold of the busbar voltage within the duration time T1 is between the low threshold N1 of the number of times and the high threshold N2 of the number of times; and controlling the busbar voltage value to be between the high threshold of the busbar voltage and low threshold of the busbar voltage, for controlling the brushless DC motor to perform slow braking until stopping.

In an embodiment, in response to the busbar voltage value triggering the high threshold of the busbar voltage more than the high threshold N2 of the number of times within the duration time T1, the PWM modulation module outputs PWM modulation signals with duty cycle of the three upper transistors of the three-phase inverter being zero and the gradual decreasing duty cycle of 5% for the three lower transistors of the three-phase inverter; in response to the number of times the busbar voltage value triggering the high threshold of the busbar voltage being less than the low threshold N1 of the number of times within the duration time T1, the PWM modulation module outputs PWM modulation signals with the duty cycle of the three upper transistors of the three-phase inverter being zero and a gradual increase of 5% duty cycle of the three lower transistors.

In an embodiment, a range of the duration time T0 is 10 ms to 100 ms, and a range of N0 is 5 to 20 times.

In an embodiment, a range of N1 is 5-10 times, a range of N2 is 20-50 times, and a range of T1 is 10 ms to 100 ms.

In an embodiment, the high threshold of the busbar voltage is a withstand voltage value of the busbar circuit, and the low threshold of the busbar voltage is a minimum threshold for ensuring braking efficiency when the brushless DC motor is braked.

The present disclosure is not limited to the specific embodiments mentioned above. Those of ordinary skill in the art can easily understand that, without departing from the principles and scope of the present disclosure, there are many other alternative solutions for the brushless DC motor braking system and method of the present disclosure. The scope of protection of the present disclosure is subject to the content of the claims.

What is claimed is:

1. A brushless DC motor braking system, comprising
a DC power supply, a three-phase inverter, and a controller, wherein the DC power supply is electrically connected to the three-phase inverter through a busbar circuit, and the three-phase inverter is electrically connected to a brushless DC motor; the controller is electrically connected to the three-phase inverter to control and drive an operation of the brushless DC motor; a voltage sampling module is electrically connected between positive and negative poles of the DC power supply for collecting a busbar voltage value of the busbar circuit when the brushless DC motor brakes;
the controller comprises a brake control module electrically connected to the voltage sampling module and internally preset with a high threshold of the busbar voltage and a low threshold of the busbar voltage;
the brake control module controls the busbar voltage value to be between the high threshold of the busbar voltage and the low threshold of the busbar voltage, for controlling the brushless DC motor to perform slow braking until stopping;
in response to the busbar voltage value triggering the high threshold of the busbar voltage, the brake control module controls six switch transistors of the three-phase inverter to turn off;
in response to the busbar voltage value triggering the low threshold of the busbar voltage, the brake control module controls three upper transistors of the three-phase inverter to turn off and three lower transistors to turn on.

2. The brushless DC motor braking system as claimed in claim 1, wherein
the brake control module comprises a computing module, a storage unit, a timing unit, and a PWM modulation module; the computing module is electrically connected to the voltage sampling module through an ADC module, and both the storage unit and the timing unit are electrically connected to the computing module; the computing module is further electrically connected to the three-phase inverter through the PWM modulation module, and the storage unit is preset with the high threshold of the busbar voltage and the low threshold of the busbar voltage.

3. The brushless DC motor braking system as claimed in claim 2, wherein
the ADC module is configured to convert an analog voltage signal sampled by the voltage sampling module into a digital voltage signal, and the digital voltage signal is the busbar voltage value;
the computing module is configured to determine whether the busbar voltage value triggers the high threshold of the busbar voltage or low threshold of the busbar voltage, and to count the number of times the busbar voltage value triggers the high threshold of the busbar voltage or low threshold of the busbar voltage;
the timing unit is configured to control the computing module to detect a duration time of the busbar voltage value triggering the high threshold or the low threshold of the busbar voltage;
the PWM modulation module generates corresponding PWM modulation signals based on different states of the busbar voltage value detected by the computing module, and the PWM modulation signals are configured to control the six switch transistors of the three-phase inverter to turn off or turn on, and control the brushless DC motor to perform slow braking process.

4. The brushless DC motor braking system as claimed in claim 3, wherein
during the slow braking process of the brushless DC motor, in response to the busbar voltage value triggering the high threshold of the busbar voltage N0 times within a duration time T0, the brake control module controls duty cycle of the PWM modulation signals of the three lower transistors of the three-phase inverter to be decreased;
in response to the busbar voltage value triggering the low threshold of the busbar voltage N0 times within the duration time T0, the brake control module controls the duty cycle of the PWM modulation signals of the three lower transistors of the three-phase inverter to be increased.

5. The brushless DC motor braking system as claimed in claim 4, wherein
a range of the duration time T0 is 10 ms to 100 ms, and a range of N0 is 5 to 20 times.

6. The brushless DC motor braking system as claimed in claim 2, wherein
the storage unit is preset with an initial duty cycle of the PWM modulation signals of the three lower transistors of the three-phase inverter when the brushless DC motor brakes, and the duty cycle of the PWM modulation signals of the three upper transistors of the three-phase inverter is always zero.

7. The brushless DC motor braking system as claimed in claim 6, wherein
a range of the low threshold N1 is 5-10 times, and a range of the high threshold N2 is 20-50 times.

8. The brushless DC motor braking system as claimed in claim 2, wherein
the storage unit is preset with a low threshold N1 of the number of times and a high threshold N2 of the number of times for triggering the high threshold of the busbar voltage by the busbar voltage value, and the high threshold N2 of the number of times being greater than the low threshold N1 of the number of times;
in response to the brushless DC motor performing the slow braking process and the number of times the busbar voltage value triggering the high threshold of the busbar voltage being greater than the high threshold N2 of the number of times, the PWM modulation module outputs the PWM modulation signals with the gradual decreasing duty cycle to the three lower transistors of the three-phase inverter, until the number of times the busbar voltage value triggering the high threshold of the busbar voltage is between the low threshold N1 of the number of times and the high threshold N2 of the number of times;

in response to the brushless DC motor performing the slow braking process and the number of times the busbar voltage value triggering the high threshold of the busbar voltage being less than the low threshold N1 of the number of times, the PWM modulation module outputs the PWM modulation signals with the gradual increasing duty cycle to the three lower transistors of the three-phase inverter, until the number of times the busbar voltage value triggering the high threshold of the busbar voltage is between the low threshold N1 of the number of times and the high threshold N2 of the number of times.

9. The brushless DC motor braking system as claimed in claim 1, wherein the high threshold of the busbar voltage is a withstand voltage value of the busbar circuit, and the low threshold of the busbar voltage is a minimum threshold for ensuring braking efficiency when the brushless DC motor is braked.

10. A brushless DC motor braking method performed by a brushless DC motor braking system, comprising:

a brushless DC motor braking with duty cycle of PWM modulation signals of three upper transistors of a three-phase inverter as zero and duty cycle of PWM modulation signals of three lower transistors of the three-phase inverter as an initial duty cycle of the PWM modulation signals;

converting an analog voltage signal sampled by a voltage sampling module into a digital voltage signal through an ADC module during a braking process, wherein the digital voltage signal is a busbar voltage value;

determining whether the busbar voltage value is between a high threshold of the busbar voltage and a low threshold of the busbar voltage in real time through a computing module;

in response to the busbar voltage value triggering the high threshold of the busbar voltage, a PWM modulation module outputting PWM modulation signals with duty cycle of all six switch transistors of the three-phase inverter being zero;

in response to the busbar voltage value triggering the low threshold of the busbar voltage, the PWM modulation module outputting PWM modulation signals with duty cycle of the PWM modulation signals of the three upper transistors of the three-phase inverter being zero and duty cycle of the PWM modulation signals of the three lower transistors of the three-phase inverter being the initial duty cycle of the PWM modulation signals;

during a slow braking process of the brushless DC motor, in response to the busbar voltage value triggering the high threshold of the busbar voltage NO times within a duration time TO, the PWM modulation module outputting PWM modulation signals with decreasing duty cycle to the three lower transistors of the three-phase inverter;

in response to the busbar voltage value triggering the low threshold of the busbar voltage NO times within the duration time TO, the PWM modulation module outputting PWM modulation signals with increasing duty cycle to the three lower transistors of the three-phase inverter; and controlling the busbar voltage value to be between the high threshold of the busbar voltage and low threshold of the busbar voltage through a brake control module, for controlling the brushless DC motor to perform slow braking until stopping; or the brushless DC motor braking method comprises:

a brushless DC motor braking with duty cycle of the PWM modulation signals of three upper transistors of a three-phase inverter as zero and duty cycle of the PWM modulation signals of three lower transistors of the three-phase inverter as an initial duty cycle of the PWM modulation signals;

converting an analog voltage signal sampled by a voltage sampling module into a digital voltage signal through an ADC module during a braking process, wherein the digital voltage signal is a busbar voltage value;

determining whether the busbar voltage value is between a high threshold of the busbar voltage and a low threshold of the busbar voltage in real time through a computing module;

in response to the busbar voltage value triggering the high threshold of the busbar voltage, a PWM modulation module outputting PWM modulation signals with duty cycle of all six switch transistors of the three-phase inverter being zero;

in response to the busbar voltage value triggering the low threshold of the busbar voltage, the PWM modulation module outputting PWM modulation signals with duty cycle of the three upper transistors of the three-phase inverter being zero and duty cycle of the three lower transistors of the three-phase inverter being the initial duty cycle of the PWM modulation signals;

in response to the number of times the busbar voltage value triggering the high threshold of the busbar voltage within a duration time T1 being greater than a high threshold N2 of the number of times, the PWM modulation module outputting PWM modulation signals with the gradual decreasing duty cycle to three lower transistors of the three-phase inverter, until the number of times the busbar voltage value triggering the high threshold of the busbar voltage within the duration time T1 is between the low threshold N1 of the number of times and the high threshold N2 of the number of times;

in response to the number of times the busbar voltage value triggering the high threshold of the busbar voltage within the duration time T1 being less than a low threshold N1 of the number of times, the PWM modulation module outputting PWM modulation signals with the gradual increasing duty cycle to three lower transistors of the three-phase inverter, until the number of times the busbar voltage value triggering the high threshold of the busbar voltage within the duration time T1 is between the low threshold N1 of the number of times and the high threshold N2 of the number of times; and controlling the busbar voltage value to be between the high threshold of the busbar voltage and low threshold of the busbar voltage through a brake control module, for controlling the brushless DC motor to perform slow braking until stopping.

11. The brushless DC motor braking method as claimed in claim 10, wherein in response to the busbar voltage value triggering the high threshold of the busbar voltage more than the high threshold N2 of the number of times within the duration time T1, the PWM modulation module outputs PWM modulation signals with duty cycle of the three upper transistors of the three-phase inverter being zero and the gradual decreasing duty cycle of 5% for the three lower transistors of the three-phase inverter;

in response to the number of times the busbar voltage value triggering the high threshold of the busbar voltage being less than the low threshold N1 of the number of times within the duration time T1, the PWM modulation module outputs PWM modulation signals with the duty cycle of the three upper transistors of the three-phase inverter being zero and a gradual increase of 5% duty cycle of the three lower transistors.

12. The brushless DC motor braking method as claimed in claim 10, wherein
a range of the duration time T0 is 10 ms to 100 ms, and a range of N0 is 5 to 20 times.

13. The brushless DC motor braking method as claimed in claim 10, wherein
a range of N1 is 5-10 times, a range of N2 is 20-50 times, and a range of T1 is 10 ms to 100 ms.

14. The brushless DC motor braking method as claimed in claim 10, wherein
the high threshold of the busbar voltage is a withstand voltage value of the busbar circuit, and the low threshold of the busbar voltage is a minimum threshold for ensuring braking efficiency when the brushless DC motor is braked.

15. A brushless DC motor braking system, comprising
a brushless DC motor, a processor and a memory storing executable instructions of the processor, wherein when the instructions are executed by the processor, the processor is configured to perform:
braking with duty cycle of PWM modulation signals of three upper transistors of a three-phase inverter as zero and duty cycle of PWM modulation signals of three lower transistors of the three-phase inverter as an initial duty cycle of the PWM modulation signals;
converting an analog voltage signal into a digital voltage signal through an ADC module during a braking process, wherein the digital voltage signal is a busbar voltage value;
determining whether the busbar voltage value is between a high threshold of the busbar voltage and a low threshold of the busbar voltage in real time;
in response to the busbar voltage value triggering the high threshold of the busbar voltage, outputting PWM modulation signals with duty cycle of all six switch transistors of the three-phase inverter being zero;
in response to the busbar voltage value triggering the low threshold of the busbar voltage, outputting PWM modulation signals with duty cycle of the PWM modulation signals of the three upper transistors of the three-phase inverter being zero and duty cycle of the PWM modulation signals of the three lower transistors of the three-phase inverter being the initial duty cycle of the PWM modulation signals;
during a slow braking process of the brushless DC motor, in response to the busbar voltage value triggering the high threshold of the busbar voltage N0 times within a duration time T0, outputting PWM modulation signals with decreasing duty cycle to the three lower transistors of the three-phase inverter;
in response to the busbar voltage value triggering the low threshold of the busbar voltage N0 times within the duration time T0, outputting PWM modulation signals with increasing duty cycle to the three lower transistors of the three-phase inverter; and
controlling the busbar voltage value to be between the high threshold of the busbar voltage and low threshold of the busbar voltage, for controlling the brushless DC motor to perform slow braking until stopping; or the processor is configured to perform:
braking with duty cycle of the PWM modulation signals of three upper transistors of a three-phase inverter as zero and duty cycle of the PWM modulation signals of three lower transistors of the three-phase inverter as an initial duty cycle of the PWM modulation signals;
converting an analog voltage signal into a digital voltage signal through an ADC module during a braking process, wherein the digital voltage signal is a busbar voltage value;
determining whether the busbar voltage value is between a high threshold of the busbar voltage and a low threshold of the busbar voltage in real time;
in response to the busbar voltage value triggering the high threshold of the busbar voltage, a PWM modulation module outputting PWM modulation signals with duty cycle of all six switch transistors of the three-phase inverter being zero;
in response to the busbar voltage value triggering the low threshold of the busbar voltage, outputting PWM modulation signals with duty cycle of the three upper transistors of the three-phase inverter being zero and duty cycle of the three lower transistors of the three-phase inverter being the initial duty cycle of the PWM modulation signals;
in response to the number of times the busbar voltage value triggering the high threshold of the busbar voltage within a duration time T1 being greater than a high threshold N2 of the number of times, outputting PWM modulation signals with the gradual decreasing duty cycle to three lower transistors of the three-phase inverter, until the number of times the busbar voltage value triggering the high threshold of the busbar voltage within the duration time T1 is between the low threshold N1 of the number of times and the high threshold N2 of the number of times;
in response to the number of times the busbar voltage value triggering the high threshold of the busbar voltage within the duration time T1 being less than a low threshold N1 of the number of times, outputting PWM modulation signals with the gradual increasing duty cycle to three lower transistors of the three-phase inverter, until the number of times the busbar voltage value triggering the high threshold of the busbar voltage within the duration time T1 is between the low threshold N1 of the number of times and the high threshold N2 of the number of times; and
controlling the busbar voltage value to be between the high threshold of the busbar voltage and low threshold of the busbar voltage, for controlling the brushless DC motor to perform slow braking until stopping.

16. The brushless DC motor braking system as claimed in claim 15, wherein
in response to the busbar voltage value triggering the high threshold of the busbar voltage more than the high threshold N2 of the number of times within the duration time T1, the PWM modulation module outputs PWM modulation signals with duty cycle of the three upper transistors of the three-phase inverter being zero and the gradual decreasing duty cycle of 5% for the three lower transistors of the three-phase inverter;
in response to the number of times the busbar voltage value triggering the high threshold of the busbar voltage being less than the low threshold N1 of the number of times within the duration time T1, the PWM modulation module outputs PWM modulation signals with the duty cycle of the three upper transistors of the three-phase inverter being zero and a gradual increase of 5% duty cycle of the three lower transistors.

17. The brushless DC motor braking system as claimed in claim 15, wherein
a range of the duration time T0 is 10 ms to 100 ms, and a range of N0 is 5 to 20 times.

18. The brushless DC motor braking system as claimed in claim 15, wherein
a range of N1 is 5-10 times, a range of N2 is 20-50 times, and a range of T1 is 10 ms to 100 ms.

19. The brushless DC motor braking system as claimed in claim 15, wherein
the high threshold of the busbar voltage is a withstand voltage value of the busbar circuit, and the low threshold of the busbar voltage is a minimum threshold for ensuring braking efficiency when the brushless DC motor is braked.

\* \* \* \* \*